United States Patent
Nachbar et al.

(10) Patent No.: US 9,482,268 B2
(45) Date of Patent: Nov. 1, 2016

(54) CONNECTING ASSEMBLY FOR A VEHICLE

(75) Inventors: Frank Nachbar, Osnabruck (DE); Dirk Adamczyk, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 275 days.

(21) Appl. No.: 14/238,762

(22) PCT Filed: Sep. 11, 2012

(86) PCT No.: PCT/EP2012/067738
§ 371 (c)(1),
(2), (4) Date: Feb. 13, 2014

(87) PCT Pub. No.: WO2013/050218
PCT Pub. Date: Apr. 11, 2013

(65) Prior Publication Data
US 2014/0294487 A1    Oct. 2, 2014

(30) Foreign Application Priority Data

Oct. 7, 2011  (DE) .................. 10 2011 084 163

(51) Int. Cl.
*F16C 11/06*  (2006.01)

(52) U.S. Cl.
CPC ........ *F16C 11/0614* (2013.01); *F16C 11/0623* (2013.01); *F16C 11/0685* (2013.01); *B60G 2204/416* (2013.01); *B60G 2204/42* (2013.01);
(Continued)

(58) Field of Classification Search
USPC ................................. 403/133–135
See application file for complete search history.

(56) References Cited

U.S. PATENT DOCUMENTS 2,027,560 A * 1/1936 Skillman .................. B62D 7/16
264/242
2,876,029 A * 3/1959 Latzen .................... B29C 70/58
403/133
(Continued)

FOREIGN PATENT DOCUMENTS

| DE | 7240604 | 4/1973 |
|---|---|---|
| DE | 196 38 252 A1 | 3/1998 |
| DE | 101 25 143 A1 | 12/2002 |
| DE | 10 2005 019 559 A1 | 11/2005 |
| DE | 10 2004 061 057 A1 | 7/2006 |
| EP | 1 953 012 A2 | 8/2008 |

OTHER PUBLICATIONS

German Search Report Corresponding to 10 2011 084 163.6 mailed Jun. 19, 2012.
(Continued)

*Primary Examiner* — Joshua J Michener
*Assistant Examiner* — Matthew Gitlin
(74) *Attorney, Agent, or Firm* — Davis & Bujold, PLLC; Michael J. Bujold

(57) ABSTRACT

A connecting assembly for a vehicle, with a structural component (11) having a connection area (14), a joint (7) having a bearing element (4) and an inner joint component (3) fitted and able to move in the latter and which extends outward the assembly, in an axial direction (5). The bearing element (4) together with the connection area (14) form an insert, and a cast element (9) is produced by casting around and enclosing the insert. The structural component (11) and the inner joint component (3) extend out of the cast element (9). The insert has a closing component (12) that engages with a mutual interlock with the structural component (11) to form, together with the structural component (11), a joint holder (8) that secures the bearing element (4) with an interlock, in the axial direction (5).

13 Claims, 4 Drawing Sheets

(52) U.S. Cl.
CPC .. *B60G 2204/4404* (2013.01); *Y10T 29/49826* (2015.01); *Y10T 403/32631* (2015.01)

(56) References Cited

U.S. PATENT DOCUMENTS

| | | | | |
|---|---|---|---|---|
| 3,025,090 A * | 3/1962 | Langen | ............... | B62D 7/16 403/132 |
| 3,074,736 A * | 1/1963 | Krizman | ............... | B60G 7/005 280/86.756 |
| 3,273,923 A * | 9/1966 | Ulderup | ............... | B62D 7/16 403/134 |
| 3,329,454 A * | 7/1967 | Melton | ............... | F16C 11/0619 403/130 |
| 3,401,965 A * | 9/1968 | Wehner | ............... | F16C 11/0647 384/271 |
| 3,849,009 A * | 11/1974 | Bourdon | ............... | F16C 11/0633 403/133 |
| 4,076,343 A | 2/1978 | McCloskey | | |
| 4,527,924 A * | 7/1985 | Asberg | ............... | B60G 7/005 403/135 |
| 5,427,467 A * | 6/1995 | Sugiura | ............... | F16C 11/0638 403/133 |
| 5,496,125 A * | 3/1996 | Maughan | ............... | F16C 11/0638 403/132 |
| 5,568,930 A * | 10/1996 | Urbach | ............... | F16C 11/0671 277/635 |
| 5,713,689 A * | 2/1998 | Pazdirek | ............... | F16C 11/0638 403/133 |
| 5,772,337 A * | 6/1998 | Maughan | ............... | F16C 11/0638 384/206 |
| 5,904,436 A * | 5/1999 | Maughan | ............... | F16C 11/0628 29/441.1 |
| 6,010,271 A * | 1/2000 | Jackson | ............... | F16C 11/0628 403/131 |
| 6,152,641 A * | 11/2000 | Rabe | ............... | F16C 11/0633 277/635 |
| 6,357,956 B1 * | 3/2002 | Zebolsky | ............... | B60G 7/005 277/635 |
| 6,913,410 B2 | 7/2005 | Blanke | | |
| 7,195,416 B2 * | 3/2007 | Holmes | ............... | F16C 11/0633 403/122 |
| 2004/0170470 A1 * | 9/2004 | Ersoy | ............... | B23K 26/28 403/135 |
| 2004/0265045 A1 * | 12/2004 | Nachbar | ............... | F16C 11/0628 403/122 |
| 2007/0065227 A1 * | 3/2007 | Sellers | ............... | B60G 7/005 403/122 |
| 2008/0038051 A1 * | 2/2008 | Broker | ............... | F16C 11/0671 403/134 |
| 2008/0193208 A1 * | 8/2008 | Nordloh | ............... | B22D 19/12 403/135 |
| 2008/0213035 A1 * | 9/2008 | Scheper | ............... | B60G 7/005 403/127 |
| 2009/0279820 A1 * | 11/2009 | Nishide | ............... | B21K 1/05 384/206 |
| 2012/0141192 A1 * | 6/2012 | Kwon | ............... | B60G 7/005 403/135 |
| 2012/0170969 A1 * | 7/2012 | Forthaus | ............... | F16C 7/02 403/50 |
| 2013/0001924 A1 * | 1/2013 | Adamczyk | ............... | B60D 1/065 280/511 |
| 2013/0071175 A1 * | 3/2013 | Adamczyk | ............... | F16C 11/0604 403/122 |
| 2013/0183080 A1 * | 7/2013 | Nachbar | ............... | F16C 11/0638 403/122 |
| 2013/0216298 A1 * | 8/2013 | Jekel | ............... | B60G 7/005 403/76 |
| 2013/0219720 A1 * | 8/2013 | Jekel | ............... | B60G 7/005 29/897.2 |
| 2014/0199113 A1 * | 7/2014 | Nordloh | ............... | F16C 11/0628 403/122 |
| 2014/0294487 A1 * | 10/2014 | Nachbar | ............... | F16C 11/0623 403/122 |
| 2014/0376989 A1 * | 12/2014 | Nachbar | ............... | B60G 11/50 403/68 |
| 2015/0003896 A1 * | 1/2015 | Nishide | ............... | F16C 11/0695 403/135 |
| 2015/0030376 A1 * | 1/2015 | Shimazawa | ............... | F16C 11/0671 403/134 |

OTHER PUBLICATIONS

International Search Report Corresponding to PCT/EP2012/067738 mailed Jan. 9, 2013.
Written Opinion Corresponding to PCT/EP2012/067738 mailed Jan. 9, 2013.

* cited by examiner

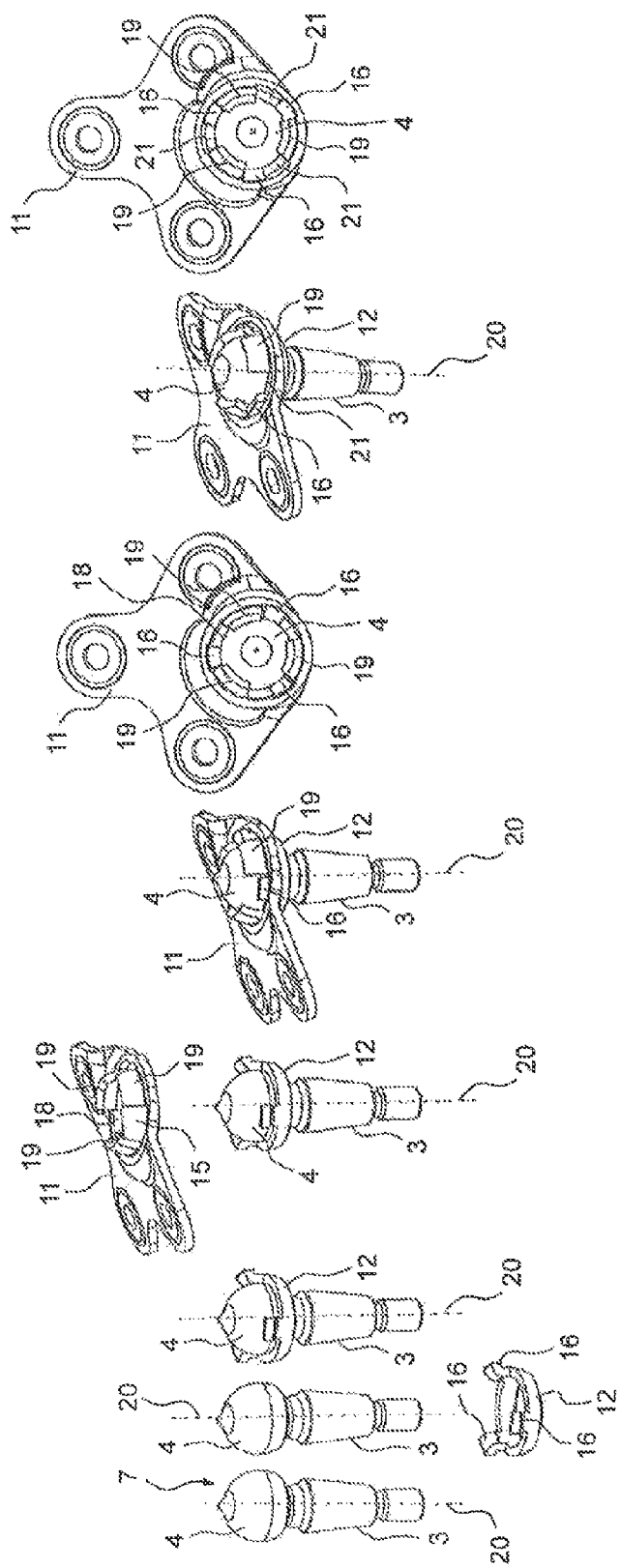

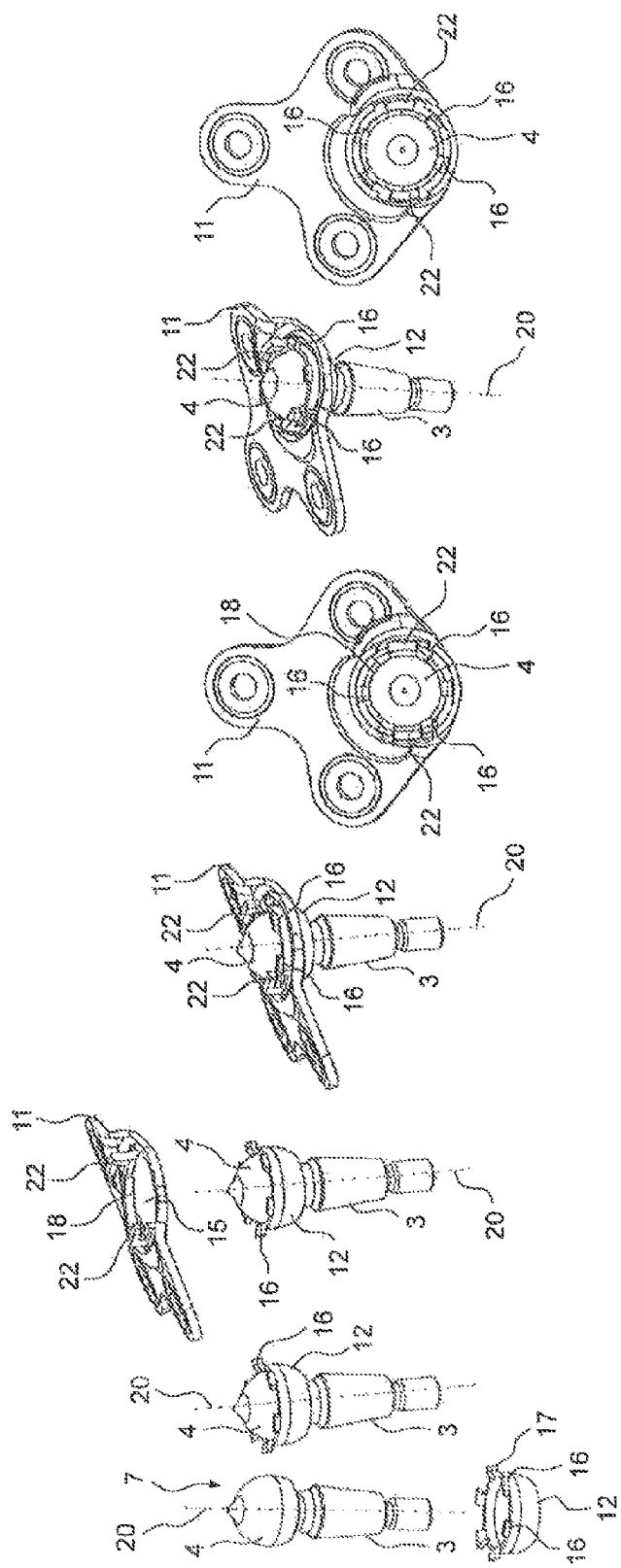

CONNECTING ASSEMBLY FOR A VEHICLE

This application is a National Stage completion of PCT/EP2012/067738 filed Sep. 11, 2012, which claims priority from German patent application serial no. 10 2011 084 163.6 filed Oct. 7, 2011.

FIELD OF THE INVENTION

The invention concerns a connecting assembly for a vehicle, with a structural component that comprises a connection area, a bearing element and a joint fitted so that it can move within the latter, which comprises an inner joint component that extends outward therefrom in an axial direction, whose bearing element together with the connection area form an insert, and a cast element produced by casting around the insert and enclosing it, out of which the structural component and the inner joint component extend outward.

BACKGROUND OF THE INVENTION

DE 196 38 252 A1 discloses a ball joint with a ball fitted into and able to rotate within a recess of a ball joint housing, the ball having a ball pin attached thereto that extends outward, such that the recess surrounds the ball over more than half its half-shell. The ball joint housing consists of a tubular wall component with locking elements facing inward, and the space formed by the wall component is filled by a housing material cast or injected therein to form the recess, in which the ball is fitted and able to rotate by virtue of an intermediate bearing layer that surrounds it at least in the area of the recess.

EP 1 953 012 A2 discloses a joint rod for use in vehicles, with a strut element connected at least at one end to a joint, such that the strut element is formed by an open section and the joint is formed by a ball of a ball pin fitted and able to move in a thin-walled sliding shell. The end of the strut element and the sliding shell are together at least partially surrounded by an injected plastic mantle, which forms the connection between the end of the strut element and the thin-walled sliding shell of the ball joint. The end of the strut element is in the form, for example, of a ring surrounding the ball.

Such ball joints, also referred to as hybrid ball joints, as a rule consist of two sub-components, of which one sub-component consists of a ball joint unit with a ball pin and a second sub-component is a structural component. The two sub-components are connected to one another in a form-interlocked manner with the help of an additional element by an assembly process (injection molding, pressure diecasting, etc.), which element thus forms a casting.

However, with such hybrid ball joints the problem arises that the maximum forces that can be transmitted in the axial direction are not large enough for every application purpose.

SUMMARY OF THE INVENTION

Starting from there the purpose of the present invention, with a connecting assembly of the type described to begin with, is to enable the axial forces that can be transmitted between the joint and the structural component, to be increased.

This objective is achieved by a connecting assembly and the method in the description that follows.

The connecting assembly for a vehicle comprises a structural component with a connection area, a bearing element and a joint fitted so that it can move within the latter, which comprises an inner joint component that extends outward therefrom in an axial direction, whose bearing element together with the connection area form an insert, and a cast element produced by casting around the insert and enclosing it, out of which the structural component and the inner joint component extend outward, wherein the insert comprises a closing component that engages with the structural component in a form-interlocked manner, which together with the structural component forms a joint holder that secures the bearing element with interlock in the axial direction. Preferably, the bearing element is axially, or at least axially, enclosed by the joint holder. Advantageously, the bearing element is treated with an adhesion promoter before being cast in place, or has on its outside an adhesion promoter applied during the production of the bearing element.

By virtue of the joint holder that secures the bearing element with interlock in the axial direction, the axial load-bearing ability of the joint is substantially increased. In particular, the axial securing provided by the joint holder additionally reinforces the axial securing provided by the cast element. Furthermore, the structural component and the closing component are separate components which both have their final shape already before the connecting assembly is assembled. In particular, the structural component and the closing component can be prefabricated completely. Thus, the connecting assembly can be put together easily and can therefore be produced inexpensively. In contrast, if the joint holder were to be made as one piece, in some cases it could be necessary to bend one or more axial securing elements radially inward to hold the bearing element after its insertion into the joint holder, since otherwise the bearing element could not be fitted. However, such a bending operation in an already assembled joint entails not inconsiderable cost and complexity.

A radial direction is, in particular, a direction or any direction that extends transversely to the axial direction. Preferably, the joint has a longitudinal central axis extending in the axial direction.

Preferably, the joint holder surrounds the longitudinal central axis of the joint, in particular all around the bearing element. Thus, the bearing element is also secured in the joint holder with interlock in the radial direction as well. In particular, the bearing element is enclosed radially by the joint holder. Advantageously, the bearing element is enclosed by the joint holder both axially and radially.

In a further development, the joint holder is in direct contact with the bearing element. This is advantageous particularly during the transmission of forces between the joint and the structural component.

The bearing element is preferably located firmly, in particular solidly in the joint holder. Advantageously, the bearing element is arranged between the structural component and the closing component, in particular between the connection area of the structural component and the closing component. The closing component and the structural component preferably engage in one another with interlock in the connection area.

Preferably, the structural component overlaps the bearing element in the axial direction on a side facing away from the closing component. In addition or alternatively, the closing component can overlap the bearing element in the axial direction on a side facing away from the structural component. In particular, the joint holder overlaps the bearing element in the axial direction on both sides.

The structural component and the closing component are preferably inserted into one another in the axial direction. In particular, the structural component and the closing component are connected to one another with interlock by screw locking means, rotary locking means or insertion and rotation locking means such as a bayonet fastener.

In one design a first one of the components (i.e. the structural component and the closing component) comprises at least one engagement element by means of which the structural component and the closing component are connected to one another in an interlocked manner. In particular, the engagement element is provided with a radial projection. The second component preferably comprises a contact surface facing away from the first component, against which the engagement element rests axially with its radial projection. Preferably, the engagement element with its radial projection is brought into contact with the contact surface by rotating the closing component relative to the structural component about the longitudinal central axis of the joint. Advantageously, the engagement element extends axially through a receiving opening provided in the second component. In particular, the bearing element is seated in the receiving opening and/or is arranged within it.

Preferably, the engagement element with its radial projection engages behind an edge that delimits the receiving opening. The edge is in particular in the form of a ring or ring segment. In particular, the contact surface is provided on the edge and/or is formed by it.

In a further development of the connecting assembly, next to or a distance away from the engagement element an axially through-going cut-out is provided in the edge, whose dimensions are such that the engagement element fits through it. This cut-out is provided for the assembly of the joint holder, in particular for the insertion of the structural component and the closing component into one another. Thus, the engagement element of the closing component can be inserted through the cut-out during the insertion into one another of the structural component and the closing component, after which the closing component is rotated relative to the structural component, in particular about its longitudinal central axis. By this rotation the closing component is connected with interlock to the structural component. In particular, the engagement element engages with its radial projection behind the edge delimiting the receiving opening. In this way the closing component and the structural component are connected to one another with interlock by means of rotary locking means or insertion and rotary locking means which preferably comprise the at least one engagement element and the edge delimiting the receiving opening, in which the at least one cut-out that allows passage of the engagement element is advantageously provided.

According to a further development the second component has at least one slot in which the engagement element engages. In particular, with its radial projection the engagement element engages radially in the slot. The slot preferably extends in, or substantially in, the circumferential direction of the joint. Preferably, in the circumferential direction of the joint the slot is open or at least open on one side. Preferably, with its radial projection the engagement element is engaged in the slot by rotating the closing component about the longitudinal central axis of the joint relative to the structural component. In particular, the radial projection is pushed into the slot. Advantageously, in the circumferential direction of the joint the slot is only open on one side. Thus, rotation of the closing component relative to the structural component can be limited by the circumferential slot. For example, the slot is provided on the edge delimiting the receiving opening, on the side that faces away from the first component. In particular, the contact surface is provided on the slot and/or formed by a surface that delimits the slot in the axial direction. Thus, the closing component and the structural component are preferably connected to one another with interlock by rotary locking means or insertion and rotary locking means, which preferably comprise the at least one engagement element and the at least one slot.

The first component is preferably the closing component and the second component is preferably the structural component. Alternatively, however, the first component can also be the structural component and the second component the closing component.

In one design the connection area is ring-shaped. In particular, the connecting area delimits one or more receiving opening(s) in which the bearing element is seated and/or arranged. The inside diameter of this receiving opening can be smaller than, larger than or equal to the largest outside diameter of the bearing element. If the inside diameter of the receiving opening is smaller than the largest outside diameter of the bearing element, then the bearing element is preferably supported axially on the edge, or one of the edges that delimit the receiving opening. Thus, the edge secures the bearing element with axial interlock on the connection area.

According to a further development, in the connection area the structural component has at least one axial securing element. In particular, the axial securing element extends in, or substantially in, the axial direction. The axial securing element can be formed by the edge that delimits the receiving opening of the structural component. Preferably, however, the axial securing element extends in, or substantially in, the axial direction away from the edge. Preferably, the axial securing element is in contact with the bearing element. Furthermore, the axial securing element can extend around or partially around the bearing element. Advantageously, the axial securing element overlaps the bearing element in the axial direction, in particular on a side facing away from the closing component. For this, relative to the axial direction, the axial securing element is at least in some areas preferably curved or inclined. Thus, preferably the bearing element is secured on the axial securing element and thus also on the structural component with interlock in the axial direction. If a plurality of axial securing elements are provided on the structural component, then in particular these are formed identically and preferably arranged uniformly distributed around the bearing element.

In one design the closing component is ring-shaped. In particular, the closing component delimits the, or one of the receiving opening(s), in which the bearing element is preferably seated and/or arranged. The inside diameter of this receiving opening can be smaller than, larger than or equal to the largest outside diameter of the bearing element. If the inside diameter of the receiving opening is smaller than the largest outside diameter of the bearing element, then the bearing element is preferably supported axially on the edge, or one of the edges that delimit the receiving opening. Thus, the edge secures the bearing element with axial interlock on the closing component.

According to a further development, the closing component has at least one axial securing element. In particular, the axial securing element extends in or substantially in the axial direction. The axial securing element can be formed of the edge that delimits the receiving opening of the closing component. Preferably, however, the axial securing element extends in or substantially in the axial direction away from the edge. Preferably, the axial securing element is in contact with the bearing element. Furthermore, the axial securing element can extend around or partially around the bearing element. Advantageously, the axial securing element overlaps the bearing element in the axial direction, in particular on a side facing away from the connection area. For this, relative to the axial direction, the axial securing element is at least in some areas preferably curved or inclined. Thus, preferably the bearing element is secured on the axial securing element and thus also on the closing component with interlock in the axial direction. If a plurality of axial securing elements are provided on the closing component, then in particular these are formed identically and preferably arranged uniformly distributed around the bearing element.

The bearing element is preferably connected firmly, in particular solidly, to the joint holder. In particular, the bearing element is connected to the joint holder firmly, in particular solidly, by means of or additionally by means of the cast element. Preferably the bearing element is connected to the connection area and/or to the closing component by means of or additionally by means of the cast element, preferably in a form-interlocked manner. The cast element is preferably connected firmly, in particular solidly, to the connection area and/or to the bearing element and/or to the closing component and/or to the insert. In particular, the cast element is in direct contact with the bearing element and/or with the connection area and/or with the closing component and/or with the insert.

In particular, the cast element is an integral body in the material of which the insert is preferably embedded. Preferably, the cast element is a solid body. The insert is preferably embedded in the material of the cast element in a form-interlocking manner. The cast element preferably consists of plastic or metal. For example, the cast element is an injection-molded component, a pressure diecasting, or produced by some other suitable casting method.

The inner joint component is in particular associated with a longitudinal central axis. Preferably, the inner joint component is designed rotationally symmetrically or substantially so relative to a rotation axis, which preferably coincides with the longitudinal central axis of the inner joint component. The inner joint component is preferably made of metal, in particular steel.

In a design of the connecting assembly, the inner joint component forms a joint pin which comprises a bearing area, which is arranged with its bearing area in the bearing element. Preferably, the bearing area is in the form of a joint ball so that the inner joint component and/or the joint pin preferably form a ball pin. Thus, in particular the joint is in the form of a ball joint. Preferably, the bearing element encloses the bearing area. The bearing element is for example designed as a bearing shell or ball socket. Preferably, the connection area and/or the closing component overlaps the bearing area in the axial direction. In particular, the joint holder overlaps the bearing area in the axial direction, preferably on both sides. The bearing area is preferably enclosed axially by the joint holder, in particular with the bearing element interposed. Furthermore, the bearing area is preferably enclosed radially by the joint holder, in particular with the bearing element interposed.

Preferably, the bearing element is designed rotation-symmetrically or substantially so relative to a rotation axis, which preferably coincides with the longitudinal central axis of the joint. In particular, the bearing element has a hollow-spherically shaped bearing surface against which a ball-shaped outer surface of the joint ball is in sliding contact. The bearing element is preferably made of plastic. The plastic can be mixed with fibers, for example glass fibers and/or carbon fibers, by which the strength of the bearing element can be increased. Alternatively, the plastic has no fibers. Advantageously, the bearing element has a ball-shaped or approximately ball-shaped outer surface.

Preferably the structural component and the inner joint component extend in different directions out of the cast element. In particular, the inner joint component extends in the axial direction out of the cast element. The structural component preferably extends transversely or obliquely to the axial direction out of the cast element. Preferably, the structural component extends out of the cast element in, or in the area of, a plane extending transversely to the axial direction and passing through the mid-point of the joint ball. This is advantageous for the transmission of radial forces between the joint and the structural component. The inner joint component extends in particular out of the joint holder, preferably in the axial direction.

The structural component is preferably made of metal, in particular steel. For example, the structural component is a sheet component. Alternatively, the structural component can comprise a tube or a bar. For example, the structural component can be an elongated or polygonal body. In particular, the structural component extends out of the cast element away from the joint, preferably transversely or obliquely to the axial direction. The structural component can be designed rotation-symmetrically or substantially so, for example when it comprises a tube or a bar. Alternatively, however, the structural component need not be a rotationally symmetrical body.

Preferably, the structural component is or can be connected, preferably firmly, to one or at least one other component at a distance away from the joint and/or the cast element. In particular, the structural component is designed to transmit forces between the joint and the other component. The other component is preferably a vehicle component. For example, the other component consists of a vehicle body part, a chassis, another joint such as another ball joint, an elastomer mounting, a track rod, a roll stabilizer, a radial control arm, a wheel carrier or any other chassis component. Preferably, the other component is at a distance away from the joint and/or the bearing element and/or the inner joint component and/or the closing component and/or the cast element.

To the structural component and/or the closing component and/or the bearing element and/or the cast element is/are preferably attached one or at least one sealing element, which extends as far as the inner joint component and is preferably in sealing contact with it. In particular, the sealing element is in contact with the inner joint component in an area outside the bearing element and/or outside the cast element. The sealing element is preferably a sealing bellows.

The invention also relates to a method for producing the connecting assembly, wherein the inner joint component is fitted and able to move in the bearing element, after which the bearing element is arranged between the structural component and the closing component and the latter is connected to the structural component with interlock before the insert, consisting of the bearing element, the connection area and the closing component, has cast around it a material that can be cast and hardened, which once hardened forms the cast element. In doing this, the connecting assembly can be developed further in accordance with all the design versions explained.

According to one design, the closing component and the structural component are connected together with interlock by a rotary joint or an insertion and rotation joint, and to form that connection they are inserted one into the other and rotated relative to one another about a longitudinal central axis extending in the axial direction. In particular, the rotation is carried out after the insertion into one another.

BRIEF DESCRIPTION OF THE DRAWINGS

Below, the invention will be described with reference to preferred embodiments, with reference to the drawing which shows:

FIG. 2: A perspective view of the ball joint shown in FIG. 1, FIG. 3: A perspective view of the ball joint with the closing component that can be seen in FIG. 1, FIG. 4: A perspective view of the ball joint and the closing component in its condition as pushed onto the ball joint, FIG. 5: A perspective view of the ball joint with the closing component pushed on, and of the structural component shown in FIG. 1, FIG. 6: A perspective view of the ball joint with the closing component pushed on, and of the structural component in its condition fitted onto the ball joint, FIG. 7: A top view of the arrangement in FIG. 6, FIG. 8: A perspective view of the ball joint with the closing component pushed on and the structural component fitted, after locking the closing component to the structural component, FIG. 9: A top view of the arrangement in FIG. 8, FIG. 10: A sectioned view through a connecting assembly according to a second embodiment, FIG. 11: A perspective view of the ball joint and the closing component in the second embodiment, FIG. 12: A perspective view of the ball joint and the closing component in the second embodiment, in the condition as pushed onto the ball joint, FIG. 13: A perspective view of the ball joint with the closing component pushed on, and of the structural component according to the second embodiment, FIG. 14: A perspective view of the ball joint with the closing component pushed on, and of the structural component according to the second embodiment, in the condition as pushed onto the ball joint, FIG. 15: A top view of the arrangement in FIG. 14, FIG. 16: A perspective view of the ball joint with the closing component pushed on and with the structural component fitted, according to the second embodiment, after the closing component has been locked onto the structural component, and FIG. 17: A top view of the arrangement in FIG. 16.

DETAILED DESCRIPTION OF THE PREFERRED EMBODIMENTS

Figure 1:
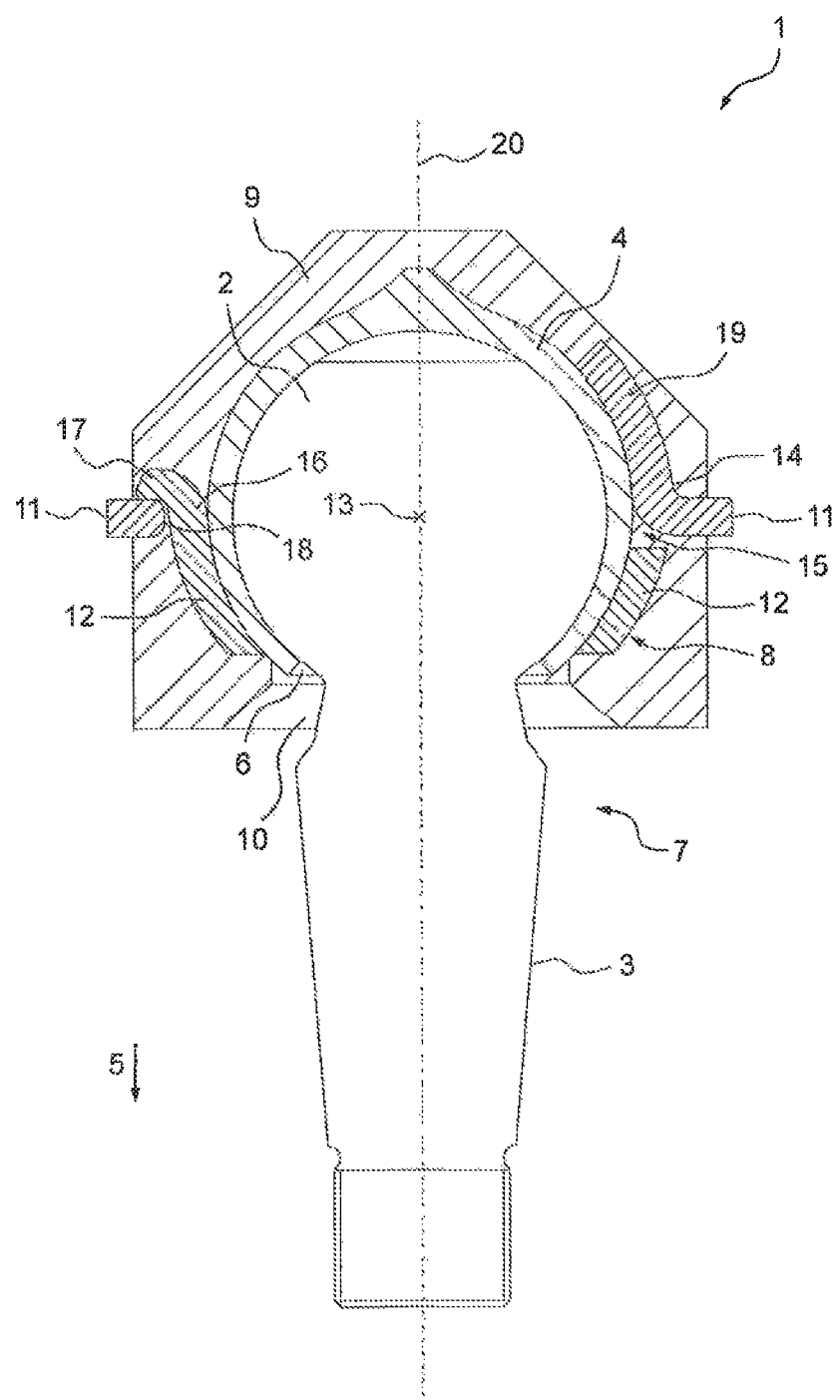
FIG. 1: A sectioned view through a connecting assembly according to a first embodiment.

FIG. 1 shows a sectioned view through a connecting assembly 1 according to a first embodiment, wherein a ball pin 3 comprising a joint ball 2 is fitted, with its joint ball 2, so that the ball can slide within a ball socket 4. The ball pin 3 extends in an axial direction 5 out of the ball socket 4 through an opening 6 provided in the ball socket 4. The ball socket 4 and the ball pin 3 together form a ball joint 7 which is seated with the ball socket 4 in a joint holder 8 that encloses the ball socket 4 radially and axially. The ball socket 4 is thus secured axially in the joint holder 8, with interlock.

The joint holder 8 and the ball socket 4 are arranged in a cast element 9 produced by casting round the joint holder 8 and the ball socket 4, a material that can be cast and then hardens, which forms the cast element 9 after it has hardened. In that sense the joint holder 8 and the ball socket 4 form an insert embedded in the cast element 9. The cast element 9 is provided with a pin opening 10 through which the ball pin 3 extends outward from the cast element 9 in the axial direction 5.

The joint holder 8 consists of a structural component 11 and a closing component 12, which engages with the structural component 11 with interlock. At the level of the mid-point 13 of the joint ball 2 the structural component 11 extends in the radial direction out of the cast element 9, and the part of the structural component 11 embedded in the cast element 9 is called the connection area 14. The connection area 14 is ring-shaped and delimits a receiving opening 15 in which the ball socket 4 is arranged. The closing component 12 has a plurality of engagement elements 16, each provided with a radial projection 17. The engagement elements 16 extend axially through the receiving opening 15 and, with their radial projections 17, engage behind an edge 18 of the structural component 11 that delimits the receiving opening. By virtue of the engagement elements 16, the structural component 11 and the closing component 12 are connected to one another with interlock.

The closing component 12 overlaps the ball socket 4 and the joint ball 2 in the axial direction on the side facing toward the pin opening 10 and is in contact with the ball socket 4. For that purpose the closing component 12 extends essentially in the axial direction, but relative thereto it is inclined or curved. Furthermore, the structural component 11 overlaps the ball socket 4 and the joint ball 2 in the axial direction on the side facing away from the pin opening 10, so that the structural component 11 is in contact with the ball socket 4. For this, the structural component 11 has a plurality of axial securing elements 19 that extend essentially in the axial direction but are inclined or curved relative to that direction and so overlap the ball socket 4 and the joint ball 2 in the axial direction on the side facing away from the pin opening 10.

Associated with the ball joint 7 is a longitudinal central axis 20 which passes through the mid-point of the ball 13 and which, in the position of the ball pin 3 shown in FIG. 1, coincides with the longitudinal central axis of the latter.

Referring to FIGS. 2 to 9, the assembly of the connecting assembly 1 according to the first embodiment will now be explained.

First, the ball socket 4 is snapped onto the joint ball 2 of the ball pin 3, so that the latter, with its joint ball 2, is fitted and able to swivel and/or rotate in the ball socket 4. The ball socket 4 and the ball pin 3 together form the ball joint 7, which is shown in FIG. 2.

The closing component 12 shown in FIG. 3 is pushed onto the ball pin 3 until it rests axially against the ball socket 4, as shown in FIG. 4. In this first embodiment the closing component 12 has three engagement elements 16, which are designed identically and are uniformly distributed around the longitudinal central axis 20 of the joint 7.

FIG. 5 shows the structural component 11, which is fitted onto the ball socket 4 on a side facing away from the closing component 12. The structural component 11 has three axial securing elements 19, which are designed identically and distributed uniformly around the longitudinal central axis 20 of the joint 7.

While the structural component 11 is being fitted on the ball socket 4, which during this is inserted into the receiving opening 15, the structural component 11 and the closing component 12 engage axially in one another. This happens thanks to the engagement elements 16, which pass through the receiving opening 15. For this to be possible, cut-outs 21 are provided in the edge 18 that delimits the receiving opening 15 (see FIG. 9), through which the engagement elements 16 extend axially. The fitted condition of the structural component 11 can be seen in perspective in FIG. 6 and in the top view shown in FIG. 7.

To lock the closing component 12 with the structural component 11, these components are rotated relative to one another about the longitudinal central axis 20 of the joint 7 so that the engagements elements 16 with their radial projections 17 (see FIG. 1) overlap the edge 18 on the side facing away from the closing component 12 and are axially in contact with the edge. This condition is shown in a perspective view in FIG. 8 and in the top view shown in FIG. 9.

Thereafter, the fluid, hardenable material is cast around the connection area 14 of the structural component 11, the closing component 12 and the ball socket 4. When it has hardened, this forms the cast element 9 shown in FIG. 1.

Figure 10:
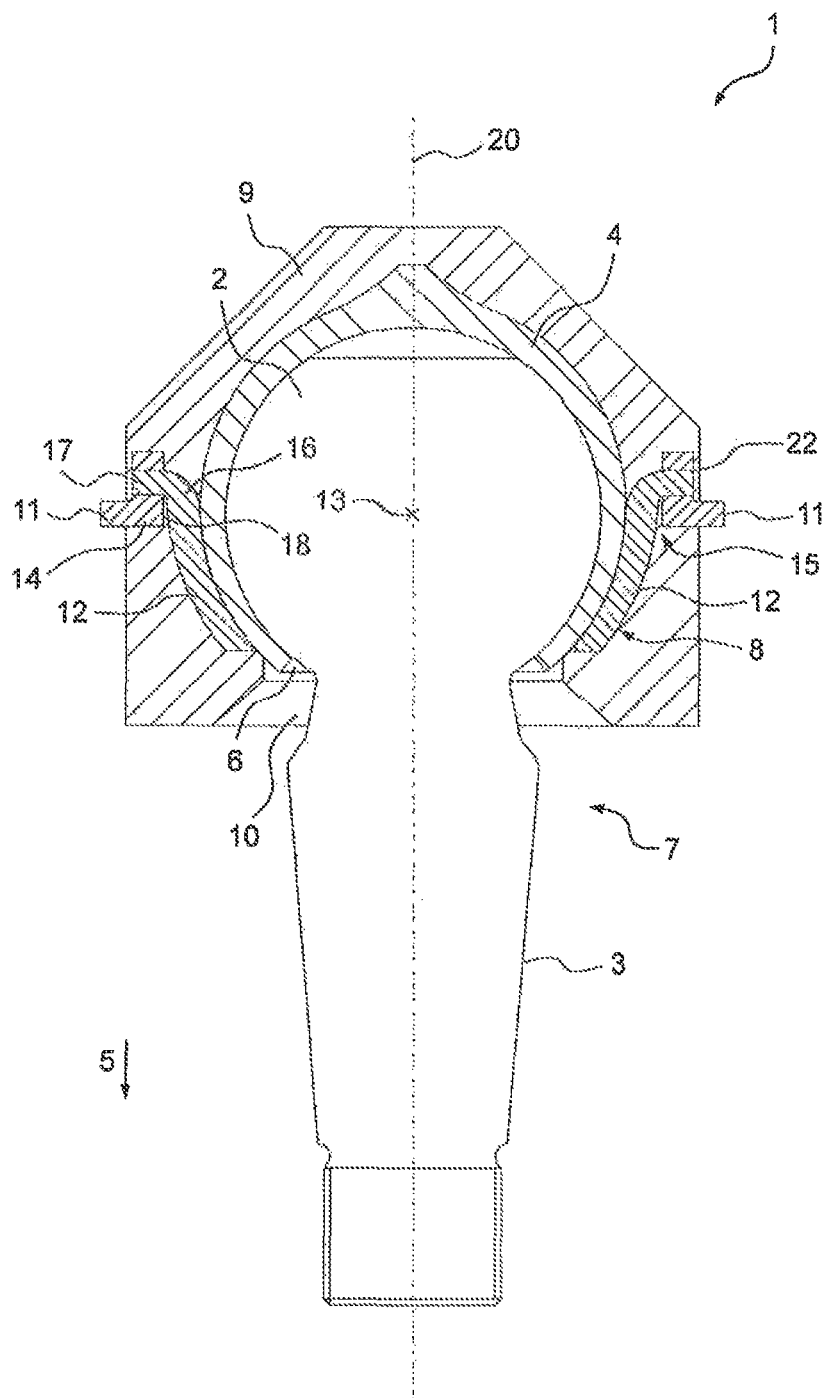

FIG. 10 shows a section through a connecting assembly 1 according to a second embodiment, wherein features similar or identical to those of the first embodiment are given the same indexes. A ball pin 3 with a joint ball 2 is fitted with its joint ball 2 able to slide within a ball socket 4 and extends through an opening 6 provided in the ball socket 4, out of the ball socket 4 in an axial direction 5. Together, the ball socket 4 and the ball pin 3 form a ball joint 7, which is seated with the ball socket 4 in a joint holder 8 that encloses the ball socket 4 radially and overlaps it axially. Thus, the ball socket 4 is secured within the joint holder 8 with axial interlock.

The joint holder 8 and the ball socket 4 are held in a cast element 9 produced by casting a fluid, hardenable material around the joint holder 8 and the ball socket 4, the material forming the cast element 9 after it has hardened. In that sense the joint holder 8 and the ball socket 4 form an insert embedded in the cast element 9. The cast element 9 is provided with a pin opening 10 through which the ball pin 3 extends out of the cast element 9 in the axial direction 5.

The joint holder 8 consists of a structural component 11, and a closing component 12 which engages in the structural component 11 with mutual interlock. In this case the closing component 12 overlaps the ball socket 4 and the joint ball 2 in the axial direction on the side facing toward the pin opening 10, and is in contact with the ball socket 4. For this, the closing component 12 extends essentially in the axial direction but is inclined or curved relative to it. Furthermore, at the level of the mid-point 13 of the joint ball 2, the structural component 11 extends in the radial direction out of the cast element 9, the part of the structural component 11 embedded in the cast element 9 being called the connection area 14. The connection area 14 is ring-shaped and delimits a receiving opening 15 through which the closing component 12 passes axially. Furthermore, the ball socket 4 is seated in the receiving opening 15 with the closing component 12 interposed. On its edge facing away from the pin opening 10, the closing component 12 has a plurality of axially spaced engagement elements 16, each provided with a radial projection 17. In addition, on its side facing away from the pin opening 10 the structural component 11 has in its connection area 14 a plurality of slots 22 that extend in the circumferential direction of the joint 7, in which in each case one of the engagement elements 16 engages with its radial projection 17. By virtue of the engagement elements 16, the structural component 11 and the closing component 12 are connected to one another with interlock.

Associated with the ball joint 7 is a longitudinal central axis 20 that extends in the axial direction 5 and passes through the mid-point 13 of the ball, which in the position shown in FIG. 10 coincides with its longitudinal central axis.

Referring to FIGS. 11 to 17, the assembly of the connecting assembly 1 according to the second embodiment will now be described.

First, the ball socket 4 is snapped onto the joint ball 2 of the ball pin 3 so that the latter, with its joint ball 2, is fitted and able to swivel and/or rotate in the ball socket 4. Together with the ball socket 4, the ball pin 3 forms the ball joint 7 which is shown in FIG. 11. The closing component 12 can also be seen in FIG. 11.

The closing component 12 is pushed onto the ball pin 3 until it is axially in contact with the ball socket 4, as shown in FIG. 12. The engagement elements 16 of the closing component 12 are of identical design and are distributed uniformly around the longitudinal central axis 20 of the joint 7.

FIG. 13 shows the structural component 11, which is fitted on the ball socket 4 on a side facing away from the closing component 12. The slots 22 of the structural component 11 are open on one side in the circumferential direction and are arranged, distributed uniformly, around the longitudinal central axis 20 of the joint 7. Furthermore, the slots 22 too are also identically designed.

During the fitting of the structural component 11 onto the ball socket 4, which is inserted with the closing component 12 into the receiving opening 15, the structural component 11 and the closing component 12 engage axially in one another. The fitted condition of the structural component 11 is shown in perspective in FIG. 14 and in the top view of FIG. 15.

To lock the closing component 12 onto the structural component 11, these components are rotated relative to one another about the longitudinal central axis 20 of the joint 7 so that part of the engagement elements 16 with their radial projections 17 move into the slots 22. This condition is shown in perspective in FIG. 16 and in a top view in FIG. 17.

Thereafter, the fluid, hardenable material is cast around the connection area 14 of the structural component 11, the closing component 12 and the ball socket 4, which when it has hardened forms the cast element 9.

INDEXES

1 Connecting assembly
2 Joint ball
3 Ball pin
4 Ball socket
5 Axial direction
6 Opening in the ball socket
7 Ball joint
8 Joint holder
9 Cast element
10 Pin opening
11 Structural component
12 Closing component
13 Mid-point of the joint ball
14 Connection area of the structural component
15 Receiving opening
16 Engagement element
17 Radial projection of the engagement element
18 Edge of the receiving opening
19 Axial securing element
20 Longitudinal central axis of the joint
21 Cut-outs in the edge of the receiving opening
22 Slot

The invention claimed is:

1. A connecting assembly for a vehicle, the connecting assembly comprising:
   a structural component (11) having an interior surface and comprising a connection area (14), and the connection area of the structural component defines a receiving opening (15),
   a joint (7) comprising a bearing element (4) and an inner joint component (3) that is received and movable within the bearing element and which extends in an axial direction (5) outward through a socket opening (6) in the bearing element,
   a closing component (12) having an interior surface that mates with an exterior surface of the bearing element (4) on an axial side of the bearing element (4) adjacent the socket opening (6),
   the bearing element (4) and the inner joint component (3) are received within the connection area (14) such that the interior surface of the structural component (11) mates with the exterior surface of the bearing element (4) on an axial side of the bearing element (4) opposite the socket opening (6), and such that the closing component (12) engages the structural component (11) on the axial side of the bearing element (4) opposite the socket opening (6) to interlock the closing component (12) and the structural component (11), the bearing element (4) and the inner joint component (3) being secured in the axial direction between the interior surfaces of the structural component (11) and the bearing element (4),
   the bearing element (4), together with the connection area (14), form an insert which comprises the closing component (12), and the structural component (11) being interlocked with the closing component (12) to form a joint holder (8), and
   the insert is encased within a cast element (9) that is cast around the insert such that the structural component (11) extends radially outward through the cast element and the inner joint component (3) extends axially out of the cast element.

2. The connecting assembly according to claim 1, wherein the joint holder (8) axially encloses the bearing element (4).

3. The connecting assembly according to claim 1, wherein the closing component (12) extends through the receiving opening of the structural component in the axial direction (5).

4. The connecting assembly according to claim 1, wherein the structural component (11) and the closing component (12) are directly connected to one another, with interlock, by one of a screw locking connection, a rotary locking connection and an insertion and rotary locking connection.

5. The connecting assembly according to claim 1, wherein the closing component (12) comprises at least one engagement element (16) which extends axially from the closing component and has a radial projection (17) that projects radially outwardly from the at least one engagement element, and the structural component (11) and the closing component (12) are interlockingly connected to one another via the at least one engagement element (16).

6. The connecting assembly according to claim 5, wherein the structural component (11) comprises the receiving opening (15), and the engagement element (16) extends axially through the receiving opening (15) such that the radial projection (17) engages an edge (18) of the structural component that delimits the receiving opening (15).

7. The connecting assembly according to claim 6, wherein the edge (18) comprises at least one axially through-going cut-out (21) that is arranged about a circumference of the receiving opening either next to or spaced away from the engagement element (16), and the at least one axially through-going cut-out (21) has dimensions that enable the engagement element (16) to pass axially therethrough.

8. The connecting assembly according to claim 5, wherein the structural component (11) has a contact surface on an axial side of the structural component that is opposite the closing component (12), and the radial projection (17) of the engagement element (16) axially abuts against the contact surface.

9. The connecting assembly according to claim 5, wherein the structural component (11) has at least one slot (22), which opens in a circumferential direction and which receives and engages with the radial projection of the engagement element (16).

10. The connecting assembly according to claim 1, wherein the connection area (14) and the closing component (12) are each ring-shaped.

11. The connecting assembly according to claim 1, wherein the connection area (14) has an axially extending securing element (19) which is curved radially inward relative to the axial direction (5) and which mates with only a portion of the exterior surface of the bearing element (4) in the axial direction (5) on the axial side of the bearing element opposite from the socket opening.

12. The connecting assembly according to claim 1, wherein the bearing element (4), the connection area (14) and the closing component (12) are fixedly connected to one another by the cast element (9).

13. The connecting assembly according to claim 1, wherein the inner joint component (3) forms a ball pin comprising a joint ball (2), and the joint ball (2) is received and enclosed within the bearing element (4).

* * * * *